Patented Mar. 14, 1933

1,901,374

UNITED STATES PATENT OFFICE

MARTIN LUTHER, OF MANNHEIM, AND HANS BELLER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF MASSES RESEMBLING LINOXYN

No Drawing. Application filed June 26, 1929, Serial No. 373,932, and in Germany July 3, 1928.

The present invention relates to the production of masses resembling linoxyn.

We have found that products resembling linoxyn can be obtained by treating with oxygen or gaseous mixtures containing the same, such as air, the mixtures of esters prepared from polyhydric alcohols, such as glycerol and sorbitol, and the unsaturated fatty acids, obtainable by splitting off water from oxidation products of waxes, including paraffin waxes and the like hydrocarbons, or from the mixture of acids, separated therefrom, for example by distilling the said oxidation products, either by themselves or in admixture with esters of other unsaturated acids. The term "esters of other unsaturated acids" also includes esters of hydroxy fatty acids which latter acids can be converted into unsaturated acids by heating. The said treatment with oxygen or gaseous mixtures containing the same is preferably carried out after heating the said mixtures of esters in the presence of a siccative, such as linoleates or resinates or equivalent agents giving siccatives with the acids of the crude esters, such as lead oxide or red lead.

The temperatures applied during the treatment with oxygen or air can be raised up to 100° C. and the heating in the presence of a drying agent may be performed at temperatures up to 200° C. This process furnishes particularly valuable products inasmuch as they are free from albuminous substances and the other impurities which are present in linoxyn prepared, for example, from linseed oil or rapeseed oil.

The products resembling linoxyn obtained in accordance with the present invention may be employed alone, or also in admixture with linoxyn obtained from the said or similar initial materials of natural origin.

The following example will further illustrate the nature of the said invention, but the invention is not restricted to this example. The parts are by weight.

Example 20 parts of the mixture of unsaturated acids having a saponification value of 261 obtainable by distilling at atmospheric pressure the acid portion insoluble in petroleum ether of an oxidation product of paraffin wax are esterified with 2.9 parts of glycerol while the temperature is raised from 150° to 200° C. 10 parts of the ester so obtained which has an acid value of 1.7 are heated with the addition of 0.2 part of lead oxide for several hours at from 180° to 200° C. while stirring. By the action of air or oxygen on the mass thus obtained a product resembling linoxyn is obtained, the mass changing from its original glutinous state into a non-glutinous rubber-like form.

What we claim is:

1. The process for the production of masses resembling linoxyn, which comprises treating with oxygen a mixture of esters of polyhydric alcohols with the unsaturated acids prepared by splitting off water from the mixture of acids resulting from the oxidation of waxes.

2. The process for the production of masses resembling linoxyn, which comprises treating with oxygen a mixture of esters of polyhydric alcohols with the unsaturated acids prepared by splitting off water from the mixture of acids resulting from the oxidation of waxes, together with esters of other unsaturated fatty acids.

3. The process for the production of masses resembling linoxyn, which comprises treating with oxygen a mixture of esters of polyhydric alcohols with the unsaturated acids prepared by splitting off water from the mixture of acids resulting from the oxidation of waxes, after heating the said esters together with a siccative.

4. The process for the production of masses resembling linoxyn, which comprises treating with oxygen a mixture of esters of polyhydric alcohols with the unsaturated acids prepared by splitting off water from the mixture of acids resulting from the oxidation of waxes, together with esters of other unsaturated fatty acids, after heating the said esters together with a siccative.

5. The process for the production of masses resembling linoxyn, which comprises heating a mixture of esters of polyhydric alcohols with the unsaturated acids prepared by splitting off water from the mixture of acids resulting from the oxidation of waxes, in the presence of oxygen after heating the said esters together with a siccative.

6. The process for the production of masses resembling linoxyn, which comprises heating a mixture of esters of polyhydric alcohols with the unsaturated acids prepared by splitting off water from the mixture of acids resulting from the oxidation of waxes, together with esters of other unsaturated fatty acids in the presence of oxygen, after heating the said esters together with a siccative.

7. As new articles of manufacture products resembling linoxyn comprising a polymerized mixture of esters of polyhydric alcohols with the unsaturated acids prepared by splitting off water from the mixture of acids resulting from the oxidation of waxes.

8. As new articles of manufacture products resembling linoxyn comprising a polymerized mixture of esters of polyhydric alcohols with the unsaturated acids prepared by splitting off water from the mixture of acids resulting from the oxidation of waxes, and a siccative.

9. The process for producing masses resembling linoxyn which comprises heating the esters formed from polyhydric alcohols and the acids obtained by splitting off water from the acid portion, insoluble in petroleum ether, of the products of the destructive oxidation of paraffin wax with a siccative at a temperature up to 200° C. and then heating the resulting product with oxygen at a temperature up to 100° C.

10. The process as defined in claim 9, wherein the polyhydric alcohol is glycerol.

In testimony whereof we have hereunto set our hands.

MARTIN LUTHER.
HANS BELLER.